Patented June 12, 1951

2,556,526

UNITED STATES PATENT OFFICE 2,556,526

METAL DERIVATIVES OF DYESTUFFS

George Frank Duffin and John David Kendall, Ilford, England, assignors to Ilford Limited, Ilford, England, a British company No Drawing. Application November 17, 1949, Serial No. 128,002. In Great Britain November 23, 1948

5 Claims. (Cl. 260—299)

This invention relates to the production of dyestuffs and pigments. In our co-pending application Serial No. 59,182 (now Patent No. 2,513,923) a process is described for producing new and valuable dyestuffs and pigments which comprises reacting together a monocarboxylic acid anhydride and a compound of the following general structure A:

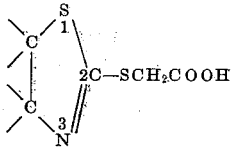

A

Such compounds may fall into three classes, viz.:

FORMULA 1

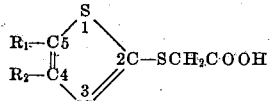

which are S-(thiazolyl-2)thioglycollic acids,

FORMULA 2

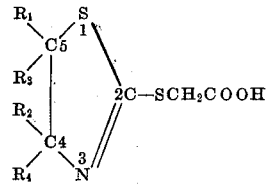

which are S - (thiazolinyl-2)thioglycollic acids, and

FORMULA 3

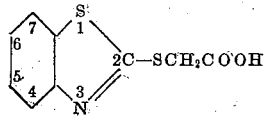

which are S-(benzthiazolyl-2)thioglycollic acids. This last class of compound may contain substituents on the benz ring, e. g. alkyl, aryl, aralkyl, alkoxy, amino and substituted amino groups or halogen atoms, or further fused benzene rings. These latter compounds may be, for example, naphthathiazole, anthrathiazole, phenanthrathiazole or anthraquinone-thiazole compounds.

The R groups in Formulae 1 and 2 may be hydrogen atoms or alkyl, aryl or aralkyl groups. Examples of suitable alkyl groups are methyl, ethyl, propyl, butyl and higher alkyl groups, aralkyl groups may be, for example, benzyl or naphthylmethyl, and aryl groups may be, for example, phenyl or naphthyl.

The structure of the dyes and pigments obtained is believed, on the evidence available from analysis, to be represented by the following formulae which show the cis and trans modifications:

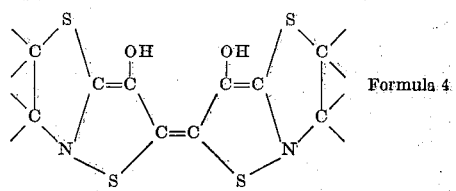

Formula 4

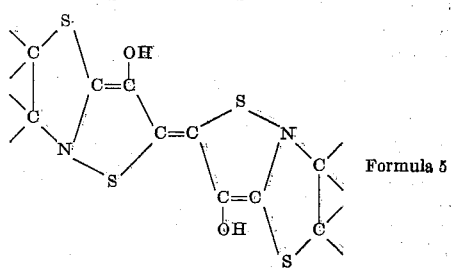

Formula 5

The hydroxy groups may be acylated in the products, due to the acylating action of the carboxylic acid anhydride, but these acyl groups are usually easily removed when the product is dissolved in alcoholic caustic soda or ammonia.

It will be seen from the foregoing formulae that the reaction takes place between two molecules of the thiogylcollic acid and results in the removal of two molecules of water with a subsequent rearrangement of the molecular structure.

The products obtained from compounds of the Formulae 1, 2 and 3 correspond to the general Formulae 4 and 5 with appropriate variations in the thiazole ring systems. They resemble indigo and thioindigo in physical characteristics, for example in respect of their colours, their insolubility and their stability, but they are not susceptible to reduction to a leuco base as are the indigos.

It has now been discovered that the aforesaid dyes and pigments form highly insoluble salts with metals other than the alkali and alkali-earth metals, and that the salts thus obtained are of value as pigmenting materials.

The conversion of the dyestuff into this metal salt is best effected by forming a solution of the dyestuff in aqueous ammonia or in caustic soda and adding thereto a solution of a soluble salt of the desired metal. The metal salt of the dyestuff then precipitates from solution and may be separated, washed and dried in the usual way.

The following examples serve to illustrate the invention:

EXAMPLE 1

*Preparation of the silver salt of the dye prepared from S-benzthiazolyl (2) thioglycollic acid*

1 part by weight of the dye (prepared as in Example 1 of our above co-pending application Serial No. 59,182) was dissolved in 20 parts by volume of aqueous ammonia (S. G. .920), 50 parts by volume of alcohol and 100 parts by volume of water. This solution was filtered hot and to it added 20 parts by volume of 10% aqueous silver nitrate solution. The silver salt was immediately precipitated, when it was filtered and washed alternately with ethyl alcohol and aqueous ammonia (S. G. .920) until the washings were colourless. After drying, the product was a dark blue powder with a bronze lustre.

EXAMPLE 2

*Preparation of the zinc salt of the dye produced from S-benzthiazolyl (2) thioglycollic acid*

0.1 part by weight of the dye (prepared as in Example 1 of our above co-pending application Serial No. 59,182) was dissolved in 10 parts of aqueous ammonia (S. G. .920) and 90 parts by volume of water and the solution filtered. To this solution was added a filtered solution of 1 part by weight of zinc chloride dissolved in 20 parts by volume of aqueous ammonia (S. G. .920). The precipitated zinc salt was filtered and then washed alternately with aqueous ammonia and ethyl alcohol until the washings became colourless. After drying, the product was a dark blue powder with a bronze lustre.

EXAMPLE 3

*Preparation of the copper salt of the dye prepared from S-benzthiazolyl (2) thioglycollic acid*

1 part by weight of the dye (prepared as in Example 1 of our above co-pending application Serial No. 59,182) was dissolved in a mixture of 20 parts by volume of aqueous ammonia (S. G. .920), 50 parts by volume of ethyl alcohol and 100 parts by volume of water and the solution filtered hot. To this solution was added a filtered solution of 5 parts by weight of copper sulphate dissolved in 100 parts by volume of water and 20 parts by volume of aqueous ammonia (S. G. .920). The copper salt was immediately precipitated and then filtered off and washed alternately with aqueous ammonia (S. G. .920) and ethyl alcohol, until the washings were colourless. The salt was then dried, giving a dark blue powder with a bronze lustre.

EXAMPLE 4

*Preparation of the silver salt of the dye prepared from S-5-bromo benzthiazolyl (2) thioglycollic acid*

0.1 part by weight of the dye (prepared as in Example 4 of our above co-pending application Serial No. 59,182) was dissolved in a mixture of 10 parts by volume of aqueous ammonia (S. G. .920) and 50 parts by volume of water. The solution was filtered and a filtered mixture of 1 part by volume of 10% aqueous silver nitrate and 10 parts by volume of aqueous ammonia (S. G. .920). The silver salt was immediately precipitated, filtered off, and washed alternately with aqueous ammonia (S. G. .920) and ethyl alcohol until the washings were colourless. The product was obtained as a dark blue powder with a bronze lustre.

By following the procedure of the foregoing examples using other soluble metal salts instead of the silver nitrate, zinc chloride and copper sulphate of these examples, corresponding metal salts of the dyes in which the metal is gold, magnesium, cadmium, mercury, aluminium, thallium, tin, lead, bismuth, chromium, molybdenum, tungsten, manganese, iron, cobalt, nickel or a rare earth metal may be obtained.

What we claim is:

1. A metal salt of a compound selected from the class consisting of compounds of the formulae:

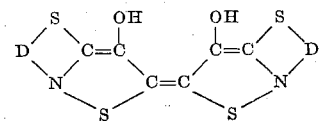

and

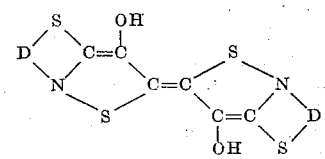

where D represents the atoms necessary to complete a ring system taken from the class consisting of thiazolyl, thiazolinyl and benzthiazolyl.

2. A metal salt of a compound selected from the class consisting of compounds of the formulae:

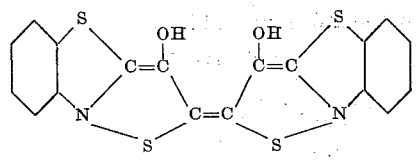

and

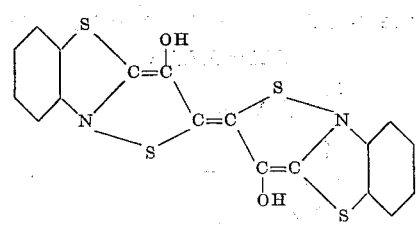

3. A silver salt of a compound selected from the class consisting of compounds of the formulae:

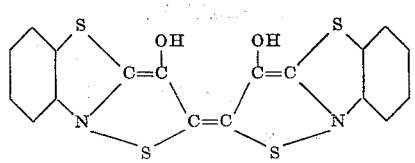

and

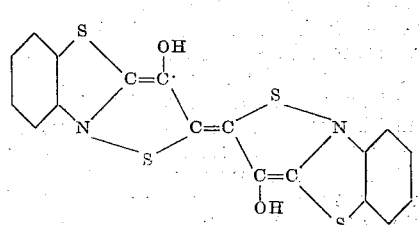

4. A copper salt of a compound selected from the class consisting of compounds of the formulae:
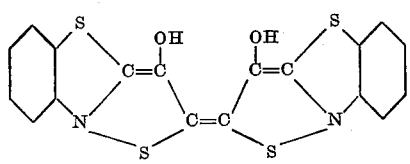
and
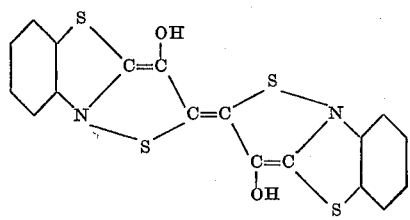
5. A zinc salt of a compound selected from the class consisting of compounds of the formulae:
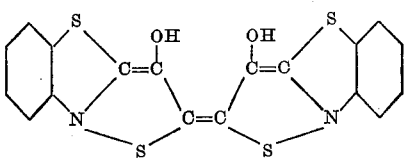
and
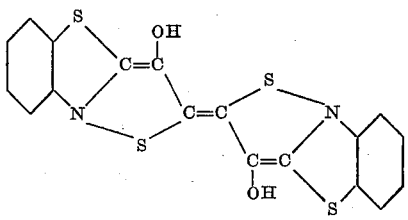
GEORGE FRANK DUFFIN.
JOHN DAVID KENDALL.
No references cited.